United States Patent
Yang et al.

(10) Patent No.: US 11,432,304 B2
(45) Date of Patent: *Aug. 30, 2022

(54) METHOD AND APPARATUS FOR TRANSMITTING SIGNAL IN WIRELESS COMMUNICATION SYSTEM

(71) Applicant: LG ELECTRONICS INC., Seoul (KR)

(72) Inventors: Suckchel Yang, Seoul (KR); Kijun Kim, Seoul (KR); Joonkui Ahn, Seoul (KR); Hanbyul Seo, Seoul (KR); Ilmu Byun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 16 days.

This patent is subject to a terminal disclaimer.

(21) Appl. No.: 17/090,629

(22) Filed: Nov. 5, 2020

(65) Prior Publication Data

US 2021/0058942 A1 Feb. 25, 2021

Related U.S. Application Data

(63) Continuation of application No. 16/517,152, filed on Jul. 19, 2019, now Pat. No. 10,863,529, which is a
(Continued)

(51) Int. Cl.
*H04L 5/00* (2006.01)
*H04W 72/12* (2009.01)
(Continued)

(52) U.S. Cl.
CPC ......... *H04W 72/121* (2013.01); *H04L 5/0044* (2013.01); *H04L 5/1469* (2013.01);
(Continued)

(58) Field of Classification Search
CPC ............. H04W 72/121; H04W 72/005; H04W 72/1273; H04W 72/1278; H04W 52/08;
(Continued)

(56) References Cited

U.S. PATENT DOCUMENTS

2011/0292858 A1 12/2011 Jones et al.
2012/0195246 A1 8/2012 Papasakellariou et al.
(Continued)

FOREIGN PATENT DOCUMENTS

CN 102273095 A 12/2011
CN 104254995 A 12/2014
(Continued)

OTHER PUBLICATIONS

Ericsson et al., "New SI proposal: Study on Latency reduction techniques for LTE", 3GPP TSG RAN Meeting #67, Shanghai, China, Mar. 9-12, 2015, RP-150465, 8 pages.
(Continued)

*Primary Examiner* — Lan-Huong Truong
(74) *Attorney, Agent, or Firm* — Birch, Stewart, Kolasch & Birch, LLP

(57) ABSTRACT

A method for a device to perform a transmission in a wireless communication system, includes transmitting a plurality of transmit power control (TPC) commands and receiving physical uplink shared channel (PUSCH) having transmit power determined using one of the plurality of TPC commands, based on a corresponding PUSCH type, wherein each one of the plurality of TPC commands is related with a respective one of PUSCH types, the PUSCH types are related with PUSCH time lengths, and the PUSCH time lengths include a time length shorter than a single subframe.

10 Claims, 15 Drawing Sheets

Related U.S. Application Data continuation of application No. 15/577,642, filed as application No. PCT/KR2016/006688 on Jun. 23, 2016, now Pat. No. 10,362,592.

(60) Provisional application No. 62/183,701, filed on Jun. 23, 2015.

(51) Int. Cl.
*H04L 5/14* (2006.01)
*H04L 27/26* (2006.01)
*H04W 72/00* (2009.01)

(52) U.S. Cl.
CPC ....... *H04L 27/2602* (2013.01); *H04W 72/005* (2013.01); *H04W 72/1273* (2013.01); *H04W 72/1278* (2013.01); *H04L 5/001* (2013.01)

(58) Field of Classification Search
CPC ... H04W 52/10; H04W 52/146; H04W 52/38; H04L 5/0044; H04L 5/1469; H04L 27/2602; H04L 5/001; H04L 5/0073; H04L 5/0092; H04L 5/0007; H04L 5/003; H04L 5/0082
See application file for complete search history.

(56) References Cited

U.S. PATENT DOCUMENTS

| | | |
|---|---|---|
| 2013/0114461 A1 | 5/2013 | Seo et al. |
| 2013/0121280 A1 | 5/2013 | Ouchi et al. |
| 2014/0293843 A1 | 10/2014 | Papasakellariou et al. |
| 2014/0362832 A1* | 12/2014 | Rudolf ................. H04L 1/1822 370/336 |
| 2015/0085721 A1 | 3/2015 | Meng |
| 2016/0029239 A1 | 1/2016 | Sadeghi et al. |
| 2016/0338023 A1 | 11/2016 | Nogami et al. |

FOREIGN PATENT DOCUMENTS

| | | | |
|---|---|---|---|
| CN | 104519580 A | 4/2015 | |
| CN | 104521307 A | 4/2015 | |
| WO | WO 2012/134115 A2 | 10/2012 | |
| WO | WO 2014/165510 A1 | 10/2014 | |
| WO | WO-2014165510 A1 * | 10/2014 | ........... H04B 17/345 |

OTHER PUBLICATIONS

Ericsson, "Areas for reducing latency", 3GPP TSG RAN WG2 #90, Tdoc R2-152415, Fukuoka, Japan, May 25-29, 2015, pp. 1-4.

LG Electronics "Downlink control channel related issues for MTC", 3GPP TSG RAN WG1 Meeting #80bis, Belgrade, Serbia, Apr. 20-24, 2015, R1-151487, pp. 1-9.

Qualcomm Incorporated, "Scope of Latency Reduction Study", 3GPP TSG-RAN WG2 Meeting #90, R2-152740, Fukuoka, Japan, May 25-29, 2015, 3 pages.

Samsung, "Dynamic Reconfiguration of TDD UL-DL Configuration," 3GPP TSG RAN WG1 Meeting #69, R1-122267, Prague, Czech Republic, May 21-25, 2012, 2 pages.

* cited by examiner

METHOD AND APPARATUS FOR TRANSMITTING SIGNAL IN WIRELESS COMMUNICATION SYSTEM

CROSS REFERENCE TO RELATED APPLICATIONS

This application is a Continuation of U.S. patent application Ser. No. 16/517,152, filed on Jul. 19, 2019 (now U.S. Pat. No. 10,863,529, issued on Dec. 8, 2020), which is a Continuation of U.S. patent application Ser. No. 15/577,642, filed Nov. 28, 2017 (now U.S. Pat. No. 10,362,592, issued on Jul. 23 2019), which is a National Phase of PCT International Application No. PCT/KR2016/006688, filed on Jun. 23, 2016, which claims priority under 35 U.S.C. 119(e) to U.S. Provisional Application No. 62/183,701, filed on Jun. 23, 2015, all of these applications are hereby expressly incorporated by reference into the present application.

BACKGROUND OF THE INVENTION

Field of the Invention

The present invention relates to a wireless communication system, and more specifically, to a method for transmitting/receiving a signal and a device for the same. The wireless communication system can support a carrier aggregation (CA).

Discussion of the Related Art

Wireless communication systems have been widely deployed to provide various types of communication services including voice and data services. In general, a wireless communication system is a multiple access system that supports communication among multiple users by sharing available system resources (e.g. bandwidth, transmit power, etc.) among the multiple users. The multiple access system may adopt a multiple access scheme such as Code Division Multiple Access (CDMA), Frequency Division Multiple Access (FDMA), Time Division Multiple Access (TDMA), Orthogonal Frequency Division Multiple Access (OFDMA), or Single Carrier Frequency Division Multiple Access (SC-FDMA).

SUMMARY OF THE INVENTION

An object of the present invention devised to solve the problem lies in a method for efficiently transmitting/receiving a signal in a wireless communication system and a device for the same. Another object of the present invention is to provide a method for efficiently controlling a transmission of uplink signal and a device for the same.

The technical problems solved by the present invention are not limited to the above technical problems and those skilled in the art may understand other technical problems from the following description.

In one aspect of the present invention, provided herein is a method for performing signal processing by a terminal in a wireless communication system, the method including receiving system information indicating a Time Division Duplex (TDD) uplink-downlink (UL-DL) configuration, receiving Multicast Broadcast Single Frequency Network (MBSFN) subframe (SF) allocation information, and performing signal processing for SF #n based on a transmission time interval (TTI) configuration of SF #n, wherein SF #n is configured with a single TTI when SF #n is a non-MBSFN SF, and is configured with multiple TTIs when SF #n is an MBSFN SF.

In another aspect of the present invention, provided herein is a terminal used in a wireless communication system, including an radio frequency (RF) unit, and a processor, wherein the processor is configured to receive system information indicating a Time Division Duplex (TDD) uplink-downlink (UL-DL) configuration, receive Multicast Broadcast Single Frequency Network (MBSFN) subframe (SF) allocation information, and perform signal processing for SF #n based on a transmission time interval (TTI) configuration of SF #n, wherein SF #n is configured with a single TTI when SF #n is a non-MBSFN SF, and is configured with multiple TTIs when SF #n is an MBSFN SF.

Preferably, when SF #n is the MBSFN SF, SF #n may include one or more DL intervals and one or more UL intervals corresponding to the multiple TTIs.

Preferably, when SF #n is the MBSFN SF, SF #n may include a plurality of DL intervals corresponding to the multiple TTIs.

Preferably, the TTI may include 14 OFDMA symbols when SF #n is the non-MBSFN SF, and include 3 OFDMA symbols when SF #n is the MBSFN SF.

Preferably, the TTI may include two 0.5-ms slots when SF #n is the non-MBSFN SF, and include one 0.5-ms slot when SF #n is the MBSFN SF.

An object of the present invention devised to solve the problem lies in a method for efficiently transmitting/receiving a signal in a wireless communication system and a device for the same. Another object of the present invention is to provide a method for efficiently controlling a transmission of uplink signal and a device for the same.

The effects of the present invention are not limited to the above-described effects and other effects which are not described herein will become apparent to those skilled in the art from the following description.

BRIEF DESCRIPTION OF THE DRAWINGS

The accompanying drawings, which are included to provide a further understanding of the invention, illustrate embodiments of the invention and together with the description serve to explain the principle of the invention. In the drawings.

DETAILED DESCRIPTION OF THE EMBODIMENTS

Embodiments of the present invention are applicable to a variety of wireless access technologies such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) is evolved from 3GPP LTE. While the following description is given, centering on 3GPP LTE/LTE-A for clarity, this is purely exemplary and thus should not be construed as limiting the present invention.

In a wireless communication system, a UE receives information from a BS on downlink (DL) and transmits information to the BS on uplink (UL). Information transmitted/received between the UE and BS includes data and various types of control information, and various physical channels are present according to type/purpose of information transmitted/received between the UE and BS.

Figure 1:
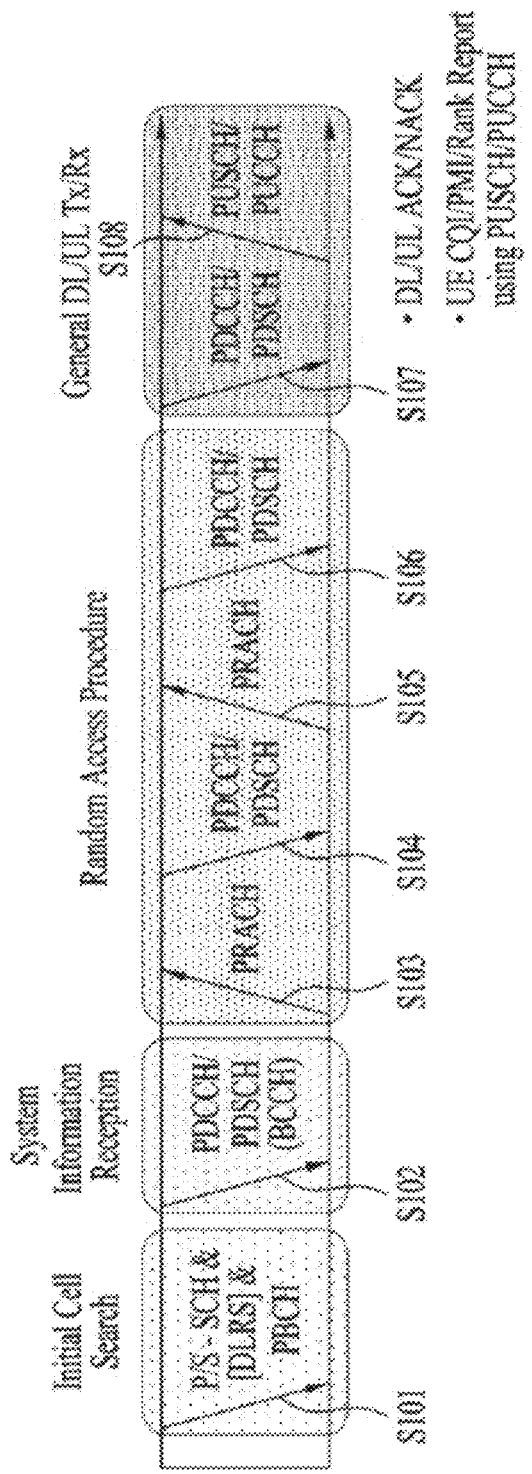
FIG. 1 illustrates physical channels used in a 3GPP LTE system, which is an example of wireless communication systems, and a signal transmission method using the same.

FIG. 1 illustrates physical channels used in a 3GPP LTE system and a signal transmission method using the same.

When powered on or when a UE initially enters a cell, the UE performs initial cell search involving synchronization with a BS in step S101. For initial cell search, the UE synchronizes with the BS and acquire information such as a cell Identifier (ID) by receiving a primary synchronization channel (P-SCH) and a secondary synchronization channel (S-SCH) from the BS. Then the UE may receive broadcast information from the cell on a physical broadcast channel (PBCH). In the meantime, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Here, control information transmitted from the UE to the BS is called uplink control information (UCI). The UCI may include a hybrid automatic repeat and request (HARQ) acknowledgement(ACK)/negative-ACK (HARQ ACK/NACK) signal, a scheduling request (SR), channel state information (CSI), etc. The CSI includes a channel quality indicator (CQI), a precoding matrix index (PMI), a rank indicator (RI), etc. While the UCI is transmitted through a PUCCH in general, it may be transmitted through a PUSCH when control information and traffic data need to be simultaneously transmitted. The UCI may be aperiodically transmitted through a PUSCH at the request/instruction of a network.

Figure 2:
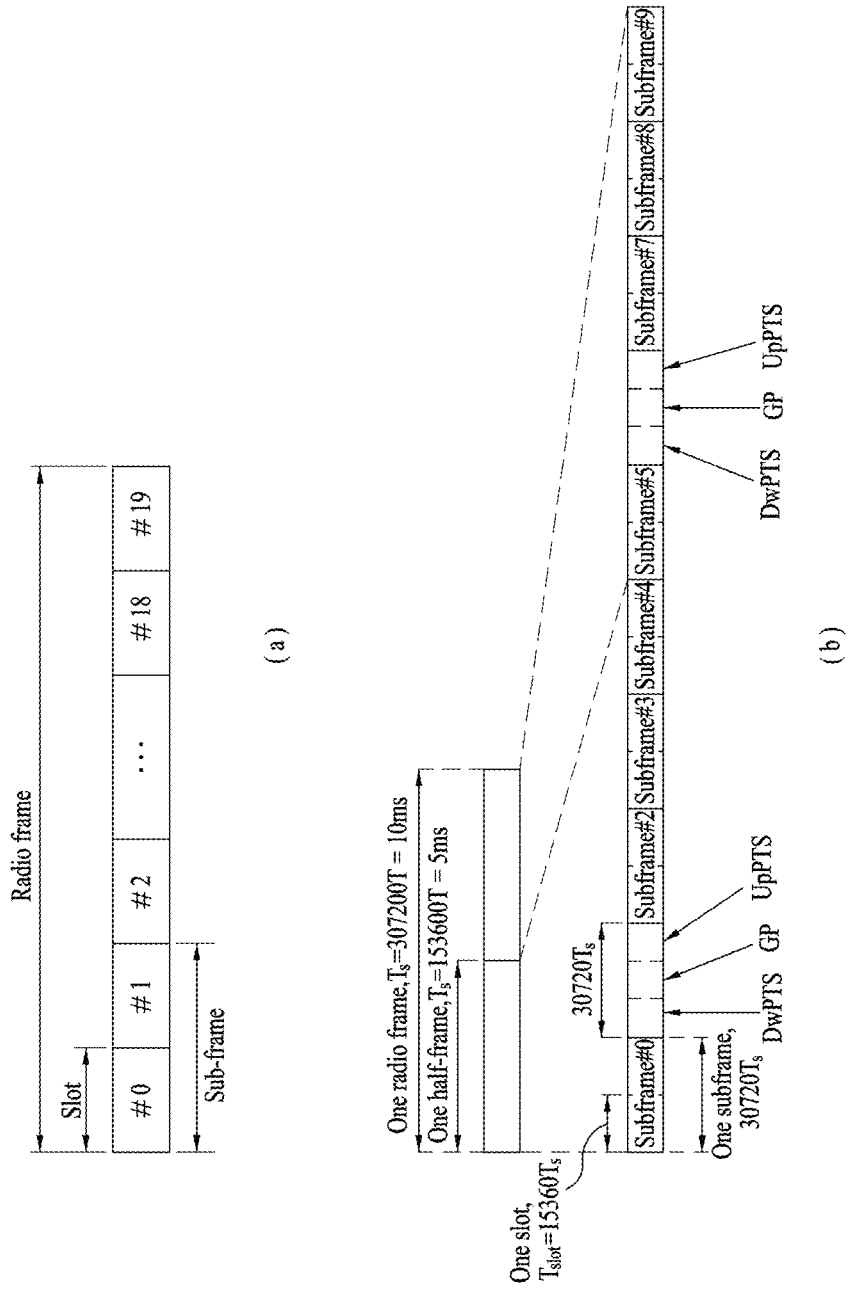
FIG. 2 illustrates a radio frame structure.

FIG. 2 illustrates a radio frame structure. In a cellular OFDM wireless packet communication system, uplink/downlink data packet transmission is performed on a sub-frame-by-subframe basis. A subframe is defined as a predetermined time interval including a plurality of OFDM symbols. 3GPP LTE supports a type-1 radio frame structure applicable to FDD (Frequency Division Duplex) and a type-2 radio frame structure applicable to TDD (Time Division Duplex).

FIG. 2(a) illustrates a type-1 radio frame structure. A downlink subframe includes 10 subframes each of which includes 2 slots in the time domain A time for transmitting a subframe is defined as a transmission time interval (TTI). For example, each subframe has a length of 1 ms and each slot has a length of 0.5 ms. A slot includes a plurality of OFDM symbols in the time domain and includes a plurality of resource blocks (RBs) in the frequency domain Since downlink uses OFDM in 3GPP LTE, an OFDM symbol represents a symbol period. The OFDM symbol may be called an SC-FDMA symbol or symbol period. An RB as a resource allocation unit may include a plurality of consecutive subcarriers in one slot.

The number of OFDM symbols included in one slot may depend on Cyclic Prefix (CP) configuration. CPs include an extended CP and a normal CP. When an OFDM symbol is configured with the normal CP, for example, the number of OFDM symbols included in one slot may be 7. When an OFDM symbol is configured with the extended CP, the length of one OFDM symbol increases, and thus the number of OFDM symbols included in one slot is smaller than that in case of the normal CP. In case of the extended CP, the number of OFDM symbols allocated to one slot may be 6. When a channel state is unstable, such as a case in which a UE moves at a high speed, the extended CP can be used to reduce inter-symbol interference.

When the normal CP is used, one subframe includes 14 OFDM symbols since one slot has 7 OFDM symbols. The first three OFDM symbols at most in each subframe can be allocated to a PDCCH and the remaining OFDM symbols can be allocated to a PDSCH.

FIG. 2(b) illustrates a type-2 radio frame structure. The type-2 radio frame includes 2 half frames. Each half frame includes 4(5) normal subframes and 1(0) special subframe. Normal subframes are used for an uplink or a downlink according to UL-DL configuration. A subframe includes 2 slots.

Table 1 shows subframe configurations in a radio frame according to UL-DL configuration.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes DwPTS (Downlink Pilot TimeSlot), GP (Guard Period), and UpPTS (Uplink Pilot TimeSlot). DwPTS is used for initial cell search, synchronization or channel estimation in a UE. UpPTS is used for channel estimation in a BS and UL transmission synchronization acquisition in a UE. The GP eliminates UL interference caused by multi-path delay of a DL signal between a UL and a DL.

The radio frame structure is merely exemplary and the number of subframes included in the radio frame, the number of slots included in a subframe, and the number of symbols included in a slot can be vary.

Figure 3:
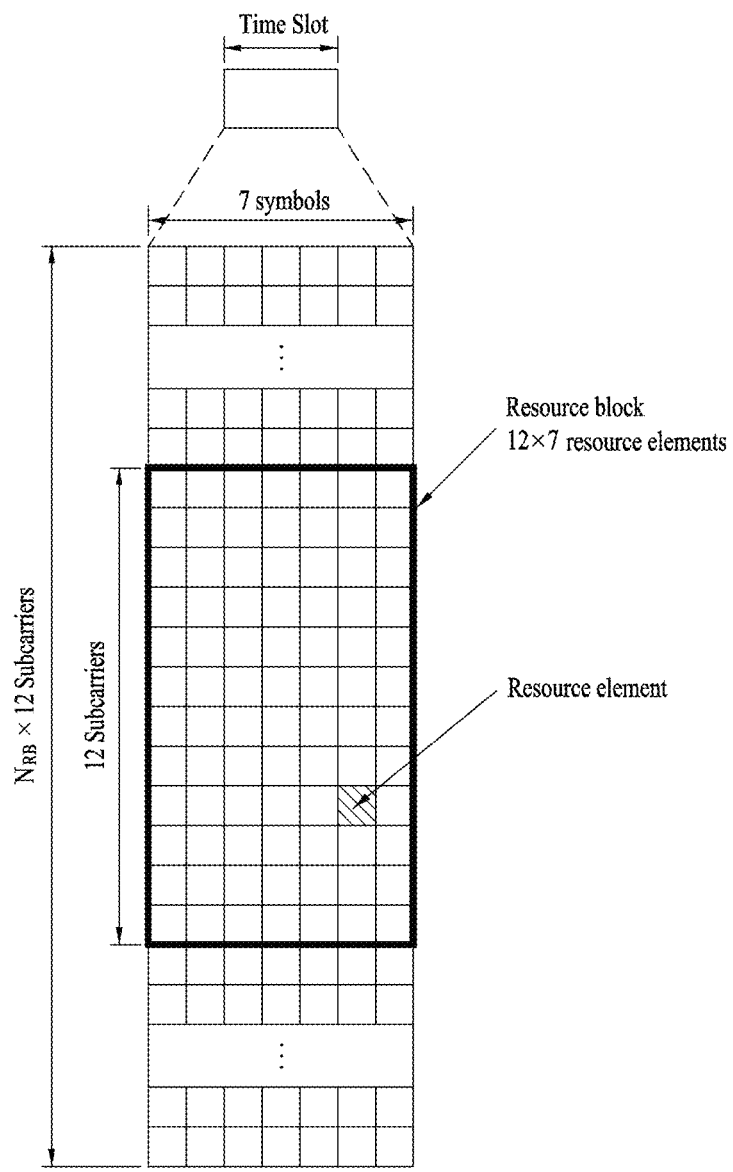
FIG. 3 illustrates a resource grid of a downlink slot.

FIG. 3 illustrates a resource grid of a downlink slot.

Referring to FIG. 3, a downlink slot includes a plurality of OFDM symbols in the time domain. One downlink slot may include 7 OFDM symbols, and one resource block (RB) may include 12 subcarriers in the frequency domain. However, the present invention is not limited thereto. Each element on the resource grid is referred to as a resource element (RE). One RB includes 12×7 REs. The number $N_{DL}$ of RBs included in the downlink slot depends on a downlink transmit bandwidth. The structure of an uplink slot may be same as that of the downlink slot.

Figure 4:
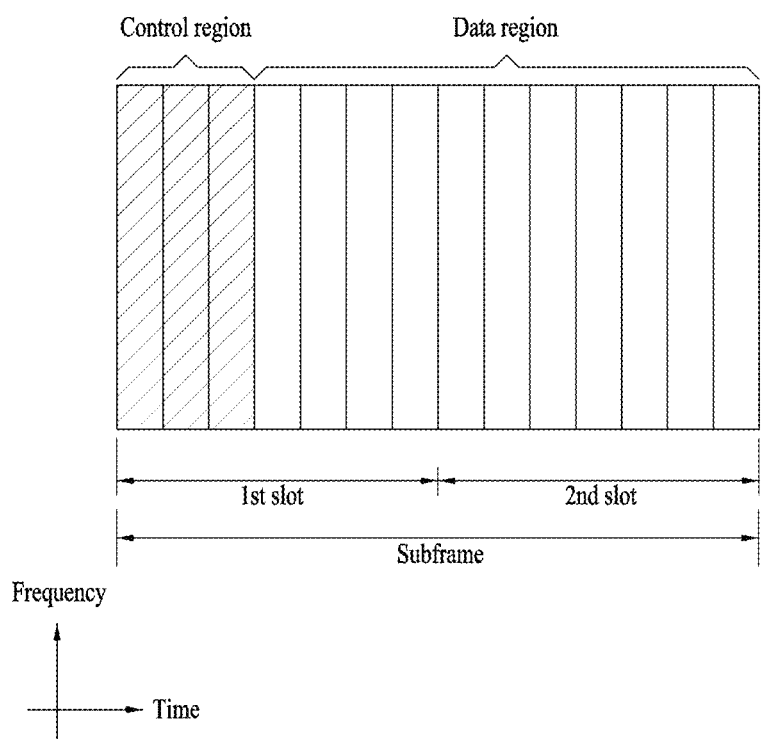
FIG. 4 illustrates a downlink subframe structure.

FIG. 4 illustrates a downlink subframe structure.

Referring to FIG. 4, a maximum of three (four) OFDM symbols located in a front portion of a first slot within a subframe correspond to a control region to which a control channel is allocated. The remaining OFDM symbols correspond to a data region to which a physical downlink shared chancel (PDSCH) is allocated. Examples of downlink control channels used in LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative-acknowledgment (NACK) signal. Control information transmitted through the PDCCH is referred to as downlink control information (DCI). The DCI includes uplink or downlink scheduling information or an uplink transmit power control command for an arbitrary UIE group.

Control information transmitted through a PDCCH is referred to as DCI. Formats 0, 3, 3A and 4 for uplink and formats 1, 1A, 1B, 1C, 1D, 2, 2A, 2B and 2C for downlink are defined as DCI formats. Information field types, the number of information fields and the number of bits of each information field depend on DCI format. For example, the DCI formats selectively include information such as hopping flag, RB allocation, MCS (modulation coding scheme), RV (redundancy version), NDI (new data indicator), TPC (transmit power control), HARQ process number, PMI (precoding matrix indicator) confirmation as necessary. A DCI format can be used to transmit control information of two or more types. For example, DCI format 0/1A is used to carry DCI format 0 or DCI format 1, which are discriminated from each other by a flag field.

A PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

Figure 5:
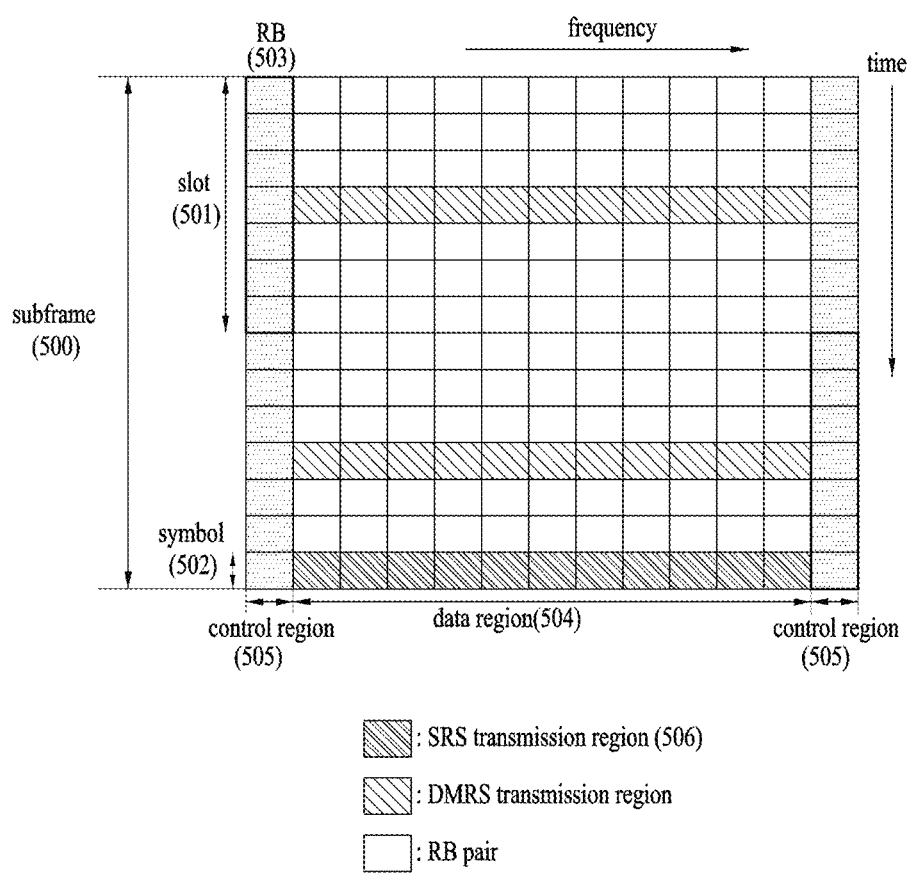
FIG. 5 illustrates an uplink subframe structure.

FIG. 5 illustrates an uplink subframe structure used in LTE.

Referring to FIG. 5, a subframe 500 includes two 0.5 ms slots 501. When a normal CP is used, each slot includes 7 symbols 502 each corresponding to an SC-FDMA symbol. A resource block 503 is a resource allocation unit corresponding to 12 subcarriers in the frequency domain and to a slot in the time domain. The uplink subframe is divided into a data region 504 and a control region 505. The data region refers to a communication resource used for a UE to transmit data such as audio data, packets, etc. and includes a PUSCH (physical uplink shared channel). The control region refers to a communication resource used for the UE to transmit uplink control information (UCI) and includes a PUCCH (physical uplink control channel).

The PUCCH can be used to transmit the following control information.

SR (scheduling request): This is information used to request a UL-SCH resource and is transmitted using On-Off Keying (OOK) scheme.

HARQ ACK: This is a response to a downlink data packet (e.g. codeword) on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. A HARQ-ACK response includes positive ACK (simply, ACK), negative ACK (NACK), DTX or NACK/DTX. Here, HARQ-ACK is used interchangeably with HARQ ACK/NACK and ACK/NACK.

CSI (channel state information): This is feedback information about a downlink channel Feedback information regarding multiple input multiple output (MIMO) includes rank indicator (RI) and precoding matrix index (PMI). 20 bits are used for each subframe.

The quantity of control information that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 2 shows the mapping relationship between PUCCH formats and UCI in LTE(-A).

TABLE 2

| PUCCH format | UCI (Uplink Control Information) |
|---|---|
| Format 1 | SR (Scheduling Request) (non-modulated waveform) |
| Format 1a | 1-bit HARQ ACK/NACK (SR exist/non-exist) |
| Format 1b | 2-bit HARQ ACK/NACK (SR exist/non-exist) |
| Format 2 | CQI (20 coded bits) |
| Format 2 | CQI and 1- or 2-bit HARQ ACK/NACK (20 bits) (corresponding to only extended CP) |
| Format 2a | CQI and 1-bit HARQ ACK/NACK (20 + 1 coded bits) |
| Format 2b | CQI and 2-bit HARQ ACK/NACK (20 + 2 coded bits) |
| Format 3 (LTE-A) | Up to 24-bit HARQ ACK/NACK + SR |

An SRS is transmitted through the last SC-FDMA symbol of the subframe (506). SRSs of multiple UEs, transmitted through the same SC-FDMA symbol, can be discriminated according to frequency position/sequence. The SRS is transmitted aperiodically or periodically.

A description will be given of TDD signal transmission timing in a single carrier (or cell) situation with reference to FIGS. 6 to 11.

Figure 6:
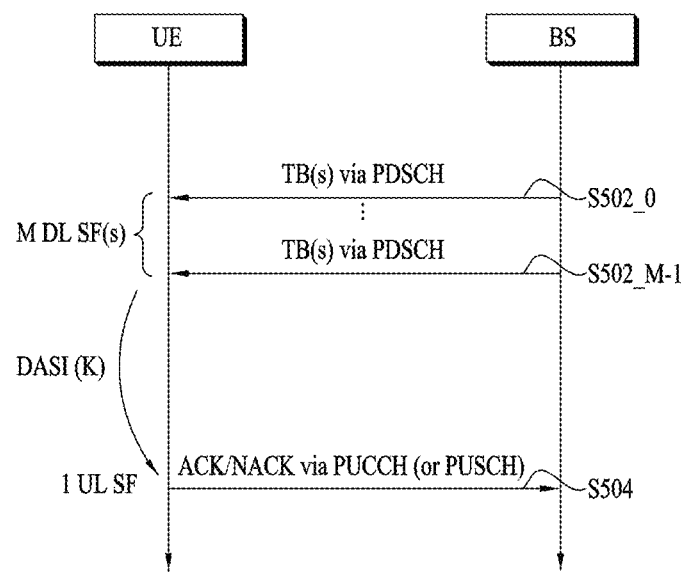
FIGS. 6 and 7 illustrate TDD UL ACK/NACK (Uplink Acknowledgement/Negative Acknowledgement) transmission timing in a single cell case.
Figure 7:
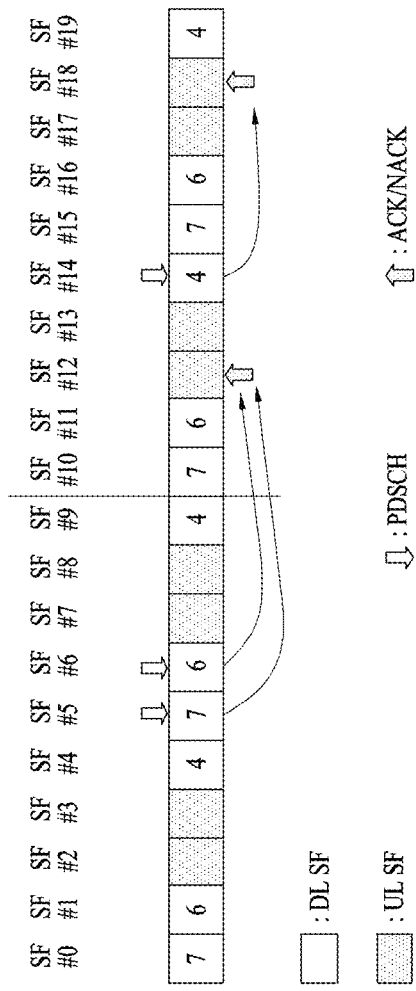

FIGS. 6 and 7 illustrate PDSCH-UL ACK/NACK timing. Here, UL ACK/NACK means ACK/NACK transmitted on uplink, as a response to DL data (e.g. PDSCH).

Referring to FIG. 6, a UE can receive one or more PDSCH signals in M DL subframes (SFs) (S502_0 to S502_M−1). Each PDSCH signal is used to transmit one or more (e.g. 2) transport blocks (TBs) according to transmission mode. A PDCCH signal indicating SPS (Semi-Persistent Scheduling) may also be received in step S502_0 to S502_M−1, which is not shown. When a PDSCH signal and/or an SPS release PDCCH signal is present in the M DL subframes, the UE transmits ACK/NACK through a UL subframe corresponding to the M DL subframes via processes for transmitting ACK/NACK (e.g. ACK/NACK (payload) generation, ACK/NACK resource allocation, etc.) (S504). ACK/NACK includes acknowledgement information about the PDSCH signal and/or an SPS release PDCCH received in step S502_0 to S502_M−1. While ACK/NACK is transmitted through a PUCCH basically, ACK/NACK is transmitted through a PUSCH when a PUSCH is transmitted at ACK/NACK transmission time. Various PUCCH formats shown in Table 2 can be used for ACK/NACK transmission. To reduce the number of ACK/NACK bits transmitted through a PUCCH format, various methods such as ACK/NACK bundling and ACK/NACK channel selection can be used.

As described above, in TDD, ACK/NACK relating to data received in the M DL subframes is transmitted through one UL subframe (i.e. M DL SF(s): 1 UL SF) and the relationship therebetween is determined by a DASI (Downlink Association Set Index).

Table 3 shows DASI (K: $\{k_0, k_1, \ldots, k_{M-1}\}$) defined in LTE(-A). Table 3 shows spacing between a UL subframe transmitting ACK/NACK and a DL subframe relating to the UL subframe. Specifically, when a PDCCH that indicates PDSCH transmission and/or SPS release is present in a subframe n-k ($k \in K$), the UE transmits ACK/NACK in a subframe n.

TABLE 3

| TDD UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

FIG. 7 illustrates UL ACK/NACK transmission timing when UL-DL configuration #1 is configured. In the figure, SF #0 to #9 and SF #10 to #19 respectively correspond to radio frames, and numerals in blocks denote UL subframes relating to DL subframes. For example, ACK/NACK for a PDSCH of SF #5 is transmitted in SF #5+7 (=SF #12) and ACK/NACK for a PDSCH of SF #6 is transmitted in SF #6+6 (=SF #12). Accordingly, both ACKs/NACKs for DL signals of SF #5/#6 are transmitted in SF #12. Similarly, ACK/NACK for a PDSCH of SF #14 is transmitted in SF #14+4 (=SF #18).

Figure 8:
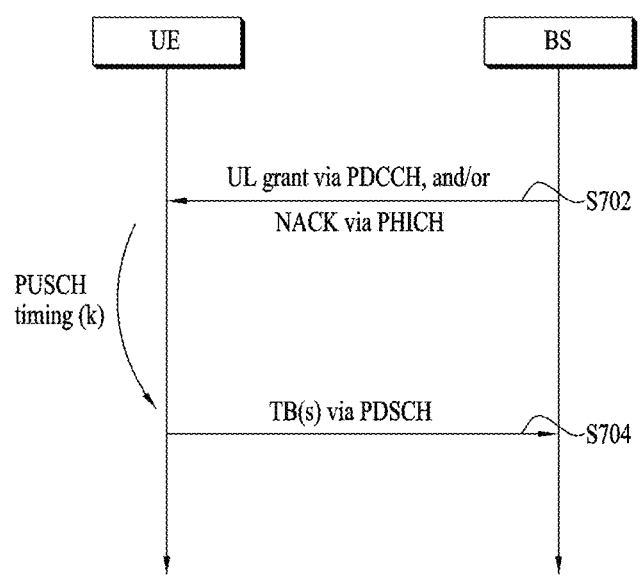
FIGS. 8 and 9 illustrate TDD PUSCH (Physical Uplink Shared Channel) transmission timing in a single cell case.
Figure 9:
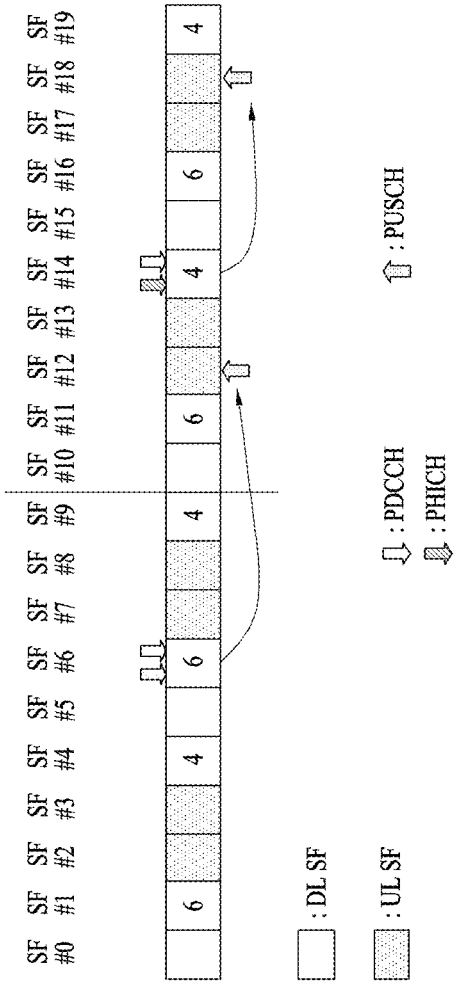

FIGS. 8 and 9 illustrate PHICH grant-PUSCH timing. A PUSCH can be transmitted corresponding to a PDCCH (UL grant) and/or a PHICH (NACK).

Referring to FIG. 8, the UE can receive a PDCCH (UL grant) and/or a PHICH (NACK) through a PDCCH (S702). Here, NACK corresponds to an ACK/NACK response to previous PUSCH transmission. In this case, the UE can initially transmit/retransmit one or more TBs through a PUSCH after k subframes via processes for PUSCH transmission (e.g. TB coding, TB-CW swiping, PUSCH resource allocation, etc.) (S704). The present embodiment is based on the assumption that a normal HARQ operation in which a PUSCH is transmitted once is performed. In this case, a PHICH and a UL grant corresponding to PUSCH transmission are present in the same subframe. However, in case of subframe bundling in which a PUSCH is transmitted multiple times through a plurality of subframes, a PHICH and a UL grant corresponding to PUSCH transmission may be present in different subframes.

Table 4 shows a UAI (Unlink Association Index) (k) for PUSCH transmission in LTE(-A). Table 4 shows spacing between a DL subframe from which a PHICH/UL grant is detected and a UL subframe relating to the DL subframe. Specifically, when a PHICH/UL grant is detected from a subframe n, the UE can transmit a PUSCH in a subframe n+k.

TABLE 4

| TDD UL-DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | | 4 | 6 | | | | 4 | 6 | | |
| 1 | | | 6 | | 4 | | | 6 | | 4 |
| 2 | | | | 4 | | | | | 4 | |
| 3 | 4 | | | | | | | 4 | 4 | |
| 4 | | | | | | | | 4 | 4 | |
| 5 | | | | | | | | 4 | | |
| 6 | | 7 | 7 | | | | 7 | 7 | | 5 |

FIG. 9 illustrates PUSCH transmission timing when UL-DL configuration #1 is configured. In the figure, SF #0 to #9 and SF #10 to #19 respectively correspond to radio frames, and numerals in blocks denote UL subframes relating to DL subframes. For example, a PUSCH corresponding to PHICH/UL grant of SF #6 is transmitted in SF #6+6 (=SF #12) and a PUSCH corresponding to a PHICH/UL grant of SF #14 is transmitted in SF #14+4 (=SF #18).

Figure 10:
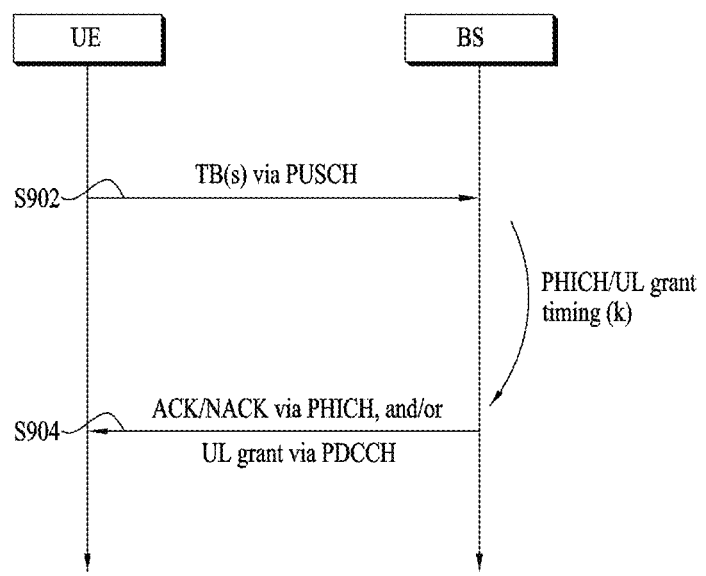
FIGS. 10 and 11 illustrate TDD DL ACK/NACK transmission timing in a single cell case.
Figure 11:
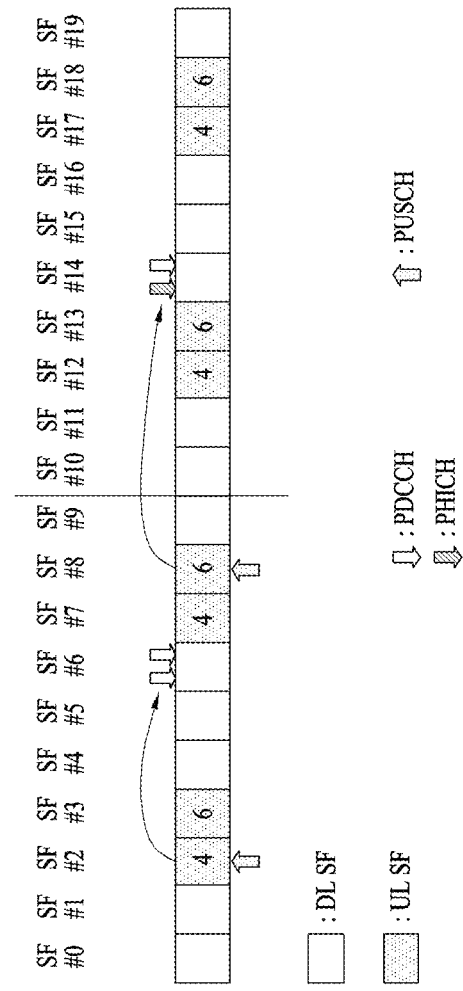

FIGS. 10 and 11 illustrate PUSCH-PHICH/UL grant timing. A PHICH is used to transmit DL ACK/NACK. Here, DL ACK/NACK means ACK/NACK transmitted on downlink as a response to UL data (e.g. PUSCH).

Referring to FIG. 10, the UE transmits a PUSCH signal to the BS (S902). Here, the PUSCH signal is used to transmit one or a plurality of (e.g. 2) TBs according to transmission mode. The BS can transmit ACK/NACK as a response to PUSCH transmission through a PHICH after k subframes via processes for ACK/NACK transmission (e.g. ACK/NACK generation, ACK/NACK resource allocation, etc.) (S904). ACK/NACK includes acknowledgement information about the PUSCH signal of step S902. When a response to PUSCH transmission is NACK, the BS can transmit a UL grant PDCCH for PUSCH retransmission to the UE after k subframe (S904). The present embodiment is based on the assumption that a normal HARQ operation in which a PUSCH is transmitted once is performed. In this case, a PHICH and UL grant used for PUSCH transmission can be transmitted in the same subframe. In case of subframe bundling, however, the PHICH and UL grant used for PUSCH transmission can be transmitted in different subframes.

Table 5 shows a UAI for PHICH/UL grant transmission in LTE(-A). Table 5 shows spacing between a DL subframe in which a PHICH/UL grant is present and a UL subframe relating to the DL subframe. Specifically, a PHICH/UL grant of a subframe i corresponds to PUSCH transmission through a subframe i-k.

TABLE 5

| TDD UL-DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | | 7 | 4 | | | | 7 | 4 | | |
| 1 | | 4 | | | 6 | | | 4 | | 6 |
| 2 | | | 6 | | | | | | 6 | |

TABLE 5-continued

| TDD UL-DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 3 | 6 | | | | | | | | 6 | 6 |
| 4 | | | | | | | | | 6 | 6 |
| 5 | | | | | | | | | 6 | |
| 6 | | 6 | 4 | | | | 7 | 4 | | 6 |

FIG. 11 illustrates PHICH/UL grant transmission timing when UL-DL configuration #1 is configured. In the figure, SF #0 to #9 and SF #10 to #19 respectively correspond to radio frames, and numerals in blocks denote DL subframes relating to UL subframes. For example, a PHICH/UL grant corresponding to a PUSCH of SF #2 is transmitted in SF #2+4 (=SF #6) and a PHICH/UL grant corresponding to a PUSCH of SF #8 is transmitted in SF #8+6 (=SF #14).

PHICH resource allocation will now be described. When a PUSCH is transmitted in subframe #n, the UE determines a PHICH resource corresponding to the PUSCH in subframe #(n+kPHICH). In case of FDD, kPHICH has a fixed value (e.g. 4). In case of TDD, kPHICH has a value depending on UL-DL configuration. Table 6 shows kPHICH for TDD is equivalent to Table 5.

TABLE 6

| TDD UL-DL Configuration | UL subframe index n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | | 4 | 7 |

A PHICH resource is provided by [PHICH group index, orthogonal sequence index]. The PHICH group index and the orthogonal sequence index are determined using (i) a lowest PRB index used for PUSCH transmission and (ii) a 3-bit field value for DMRS (Demodulation Reference Signal) cyclic shift. Here, (i) and (ii) are indicated by a UL grant PDCCH.

Figure 12:
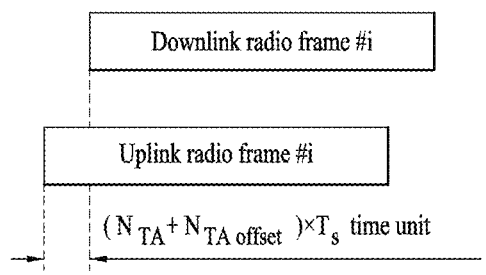
FIG. 12 illustrates uplink-downlink frame timing relation.

FIG. 12 illustrates uplink-downlink frame timing relation.

Referring to FIG. 12, transmission of the uplink radio frame number i starts prior to $(N_{TA}+N_{TAoffset})*T_s$ seconds from the start of the corresponding downlink radio frame. In case of the LTE system, $0 \le N_{TA} \le 20512$, $N_{TAoffset}=0$ in FDD, and $N_{TAoffset}=624$ in TDD. The value $N_{Taoffset}$ is a value in advance recognized by the BS and the UE. If $N_{TA}$ is indicated through a timing advance command during a random access procedure, the UE adjusts transmission timing of UL signal (e.g., PUCCH/PUSCH/SRS) through the above equation. UL transmission timing is set to multiples of $16T_s$. The timing advance command indicates the change of the UL timing based on the current UL timing. The timing advance command $T_A$ within the random access response is a 11-bit timing advance command, and indicates values of 0, 1, 2, . . . , 1282 and a timing adjustment value is given by $N_{TA}=T_A*16$. In other cases, the timing advance command $T_A$ is a 6-bit timing advance command, and indicates values of 0, 1, 2, . . . , 63 and a timing adjustment value is given by $N_{TA,new}=N_{TA,old}+(T_A-31)*16$. The timing advance command received at subframe n is applied from the beginning of subframe n+6. In case of FDD, as shown, transmitting timing of UL subframe n is advanced based on the start time of the DL subframe n. On the contrary, in case of TDD, transmitting timing of UL subframe n is advanced based on the end time of the DL subframe n+1 (not shown).

Embodiment: Short DL/UL

In the next system after LTE-A, low latency-based control and data transmission may be considered. To this end, a time unit (e.g., a transmission time unit (TTI)) for performing transmission and reception of a single DL/UL datum (e.g., a DL/UL-SCH transport block) should be shorter than the existing single SF (i.e., 1 ms). For example, for low latency-based control and data transmission, the TTI may have to be configured with three OFDMA/SC-FDMA symbols or one slot duration. For convenience, the following terms are defined.

short TU: Indicates a time unit (i.e., TTI) in which transmission/reception of a single DL/UL datum (e.g., transport block) is performed. For low-latency transmission, the short TU is set to be shorter than the TTI (i.e., 1 SF=1 ms) of the legacy system (e.g., LTE/LTE-A). For example, the short TU may be set to three OFDMA/SC-FDMA symbols or one slot duration. For simplicity, the TTI of the legacy system is referred to as a normal TTI and the short TU is referred to as a short TTI.

short DL: Represents a DL duration consisting of one short TU.

short UL: Represents a UL duration consisting of one short TU.

short TI: Represents the (minimum) time interval/latency between control information and data (see FIGS. 6 to 11). For example, the short TI may represent (i) the (minimum) time interval/latency between a DL data reception time and a HARQ-ACK transmission time through short DL (see FIG. 6), or (ii) the (minimum) time interval/latency between a DL grant reception time through short DL and a UL data transmission time through short UL (see FIG. 8). The short TI may be expressed as a time interval between a short DL/UL and a short UL/DL. For low-latency transmission, the short TI may be set to be shorter than the time interval (e.g., 4 SFs=4 ms) of the legacy system (e.g., LTE/LTE-A). As an example, a short TI may be set to one or two SF intervals (e.g., 1 ms or 2 ms).

In the conventional TDD system (e.g., LTE/LTE-A), a 1-ms SF is configured based on the UL-DL configuration (see Table 1) broadcast through the SIB. To configure a short TU in the conventional TDD system, a short DL may be inserted only in the DL SF and a short UL may be inserted only in the UL SF. However, in this method, the short DL/UL is configured depending only on the UL-DL configuration-based SF structure, and thus it is not easy to support (secure and maintain) a short TI between the control information and the data (i.e., between the short DL/UL and the short UL/DL) due to a duration having a plurality of contiguous identical (DL or UL) SFs. For example, in the case of TDD UL-DL configuration #1, the SF configuration is set to [D S U U D D S U U D] in units of radio frames. When the method described above is applied to this case, the DL SFs and the UL SFs are contiguous at least twice respectively, and therefore it may be difficult to secure a short TI of 2 ms or less (e.g. 1 ms). Here, D, S and U denote DL SF, S (special) SF and UL SF, respectively (see Table 1).

Hereinafter, the present invention proposes a method of configuring a short TU for low latency-based control and data transmission in a TDD system. More specifically, a method of configuring a short DL and a short UL to support the short TI between control information and data in the conventional UL/DL SF configuration-based TDD system is discussed. HARQ-ACK for the DL data received through the short DL or UL data corresponding to the UL grant DCI/PHICH detected through the short DL may be transmitted through a short UL after the short TI (or within a certain time) from the short DL. A (retransmission) DL grant DCI for the DL data corresponding to HARQ-ACK (e.g., NACK) transmitted through short UL, or a PHICH/UL grant DCI corresponding to the UL data transmitted through a short DL after the short TI (or within a certain time) from the short UL.

In the following description, a case where the short UL/DL is configured in an existing SF is exemplarily disclosed, but the SF is merely an example of a time duration capable of including a plurality of short TUs. Therefore, in the following description, the SF may be generalized to any time interval (e.g., slot, radio frame, DL interval, UL interval, etc.) including a plurality of short TUs e.g., slot, radio frame, DL interval, UL interval, etc.).

(1) Configuring a Short DL in a UL SF (Method 1)

One or a plurality of short DLs may be configured in one existing UL SF. Specifically, Opt 1) one or more short DLs may be configured over one UL SF in the time domain, Opt 2) one or more short DLs may be configured over the interval excluding some symbols (the first few symbols and/or the last few symbols) in the UL SF. The symbols include an OFDAM symbol or an SC-FDMA symbol. The symbol interval excluded from Opt 2 may Alt 1) be used/configured as a gap for switching between DL and UL, or Alt 2) be used to transmit a specific UL signal (e.g., SRS) configured in the original UL SF or separately configured for a short TU operation UE. The above method may be similarly used in configuring one or a plurality of short ULs in one UL SF.

Meanwhile, UL SF information in which the short DL is configured or configurable may be configured for a UE, and the UE may perform DL signal/channel detection and reception operations for the short DL (e.g., detection of DL/UL grant DCI for scheduling short DL/UL, reception of DL data scheduled on short DL, etc.) in a specific situation. For example, if there is no scheduling/configuration of a UL signal/channel in a specific UL SF (and/or a UL SF immediately adjacent to the specific UL SF), the UE may attempt to detect/receive DL (e.g., DL/UL grant DCI, etc.) for the short DL in the UL SF. As another example, if the UE has transmitted HARQ-ACK or UL data through a specific short UL, the UE may attempt to detect/receive DL (e.g., DL/UL grant DCI for scheduling DL/UL data (re-)transmission, PHICH, etc.) for the short DL in a UL SF at a time (or within a certain time) after the short TI from the short UL.

(2) Configuring a Short UL in a DL SF (Method 2)

One or a plurality of short ULs may be configured in one existing DL SF. Specifically, while a DL SF is configured as a (fake) MBSFN (Multicast Broadcast Single Frequency Network) SF, one or more short ULs may be configured in the interval excluding a few initial symbols (or a first part of the symbols and a last part of the symbols) in the DL SF. The MBSFN SF is divided into a non-MBSFN region and an MBSFN region. The non-MBSFN region is composed of first one or two OFDMA symbols in the MBSFN SF and the MBSFN region is composed of OFDMA symbols not used for the non-MBSFN region in the MBSFN SF. Since the existing UE reads only the non-MBSFN region in the MBSFN SF, the short UL may be configured in the MBSFN region so as not to affect the existing UEs. That is, a specific DL SF may be configured as an MBSFN SF (fake MBSFN SF) for the purpose of configuring a short UL instead of the MBSFN service. The MBSFN SF is indicated using a bitmap and is repeated periodically. The first few symbols excluded from short UL configuration in the DL SF may be used/configured for control transmission (e.g., PDCCH, PHICH, etc.) and a DL/UL switching gap for an existing UE operating only in the TTI (and/or a UE for which the short TU operation is configured). Alt ½ of Method 1 may be applied to the last few symbols excluded from short UL configuration in the DL SF. The above method may be similarly used in configuring one or a plurality of short DLs in one DL SF.

DL SF (configured as MBSFN SF) information in which the short UL is configured or configurable may be configured for a UE, and the UE may perform UL signal/channel transmission operation (e.g., HARQ-ACK transmission for DL data reception in the short DL, UL data transmission scheduled from the short DL, etc.) through the short UL in the DL SF in a specific situation. For example, when the UE receives DL data or UL grant DCI (and/or PHICH) through a specific short DL, the UE may perform transmission of UL (e.g., HARQ-ACK for DL data reception, UL data corresponding to UL grant DCI/PHICH, etc.) through an MBSFN DL SF after the short TI (or within a certain time) from the short DL.

(3) Configuring a Short DL in an S SF (Method 3)

One or a plurality of short DLs may be configured in one existing S SF. Specifically, one or more short DLs may be configured in the interval excluding some symbols (the first few symbols and/or the last few symbols) in the S SF. The first few symbols excluded from short DL configuration in the S SF may be used/configured for control transmission (e.g., PDCCH, PHICH, etc.) for the existing TTI operation UE (and/or the short TU operation UE). Alt ½ of Method 1 may be applied to the last few symbols excluded from short DL configuration in the S SF. In the case of a specific short DL, all or a part of the symbols constituting the short DL may be outside the DwPTS interval originally configured in the S SF, or may overlap the UpPTS interval.

Meanwhile, S SF information in which the short DL is configured or configurable may be configured for a UE, and the UE may perform DL signal/channel detection and reception operations for the short DL (e.g., detection of DL/UL grant DCI for scheduling short DL/UL, reception of DL data scheduled on short DL, etc.) in a specific situation. For example, if there is no scheduling/configuration of a UL signal/channel in a specific S SF (and/or a UL SF immediately adjacent to the specific SF), the UE may attempt to detect/receive DL (e.g., DL/UL grant DCI, etc.) for the short DL in the S SF. As another example, if the UE has transmitted HARQ-ACK or UL data through a specific short UL, the UE may attempt to detect/receive DL (e.g., DL/UL grant DCI for scheduling DL/UL data (re-)transmission, PHICH, etc.) for the short DL in an S SF at a time (or within a certain time) after the short TI from the short UL.

(4) Configuring a Short UL in an S SF (Method 4)

One or a plurality of short ULs may be configured in one existing S SF.

Specifically, one or more short ULs may be configured in the interval excluding some symbols (the first few symbols and/or the last few symbols) in the S SF. The first few symbols excluded from short UL configuration in the S SF may be used/configured for control transmission (e.g., PDCCH, PHICH, etc.) and a DL/UL switching gap for the existing TTI operation UE (and/or the short TU operation UE). Alt ½ of Method 1 may be applied to the last few symbols excluded from short UL configuration in the S SF. In addition, for short UL configuration in the S SF, the S SF configuration is preferably set to have the shortest DwPTS interval (e.g., three-symbol interval). In the case of a specific short UL, all or a part of the symbols constituting the short UL may be outside the DwPTS interval originally configured in the S SF, or may overlap the UpPTS interval.

Table 7 shows the DwPTS/GP/UpPTS length according to S SF configurations. In S SF configurations #0 and #5, DwPTS consists of three symbols. In the other SF configurations, DwPTS consists of more than three symbols.

TABLE 7

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_S$ | $2192 \cdot T_S$ | $2560 \cdot T_S$ | $7680 \cdot T_S$ | $2192 \cdot T_S$ | $2560 \cdot T_S$ |
| 1 | $19760 \cdot T_S$ | | | $20480 \cdot T_S$ | | |
| 2 | $21952 \cdot T_S$ | | | $23040 \cdot T_S$ | | |
| 3 | $24144 \cdot T_S$ | | | $25600 \cdot T_S$ | | |
| 4 | $26336 \cdot T_S$ | | | $7680 \cdot T_S$ | $4384 \cdot T_S$ | $5120 \cdot T_S$ |
| 5 | $6592 \cdot T_S$ | $4384 \cdot T_S$ | $5120 \cdot T_S$ | $20480 \cdot T_S$ | | |
| 6 | $19760 \cdot T_S$ | | | $23040 \cdot T_S$ | | |
| 7 | $21952 \cdot T_S$ | | | — | — | — |
| 8 | $24144 \cdot T_S$ | | | — | — | — |

Meanwhile, S SF information in which the short DL is configured or configurable may be configured for a UE, and the UE may perform UL signal/channel transmission operation (e.g., HARQ-ACK transmission for DL data reception in the short DL, UL data transmission scheduled from the short DL, etc.) through the short UL in the S SF in a specific situation. For example, when the UE receives DL data or UL grant DCI (and/or PHICH) through a specific short DL, the UE may perform transmission of UL (e.g., HARQ-ACK for DL data reception, UL data corresponding to UL grant DCI/PHICH, etc.) through the S SF after the short TI (or within a certain time) from the short DL.

Figure 13:
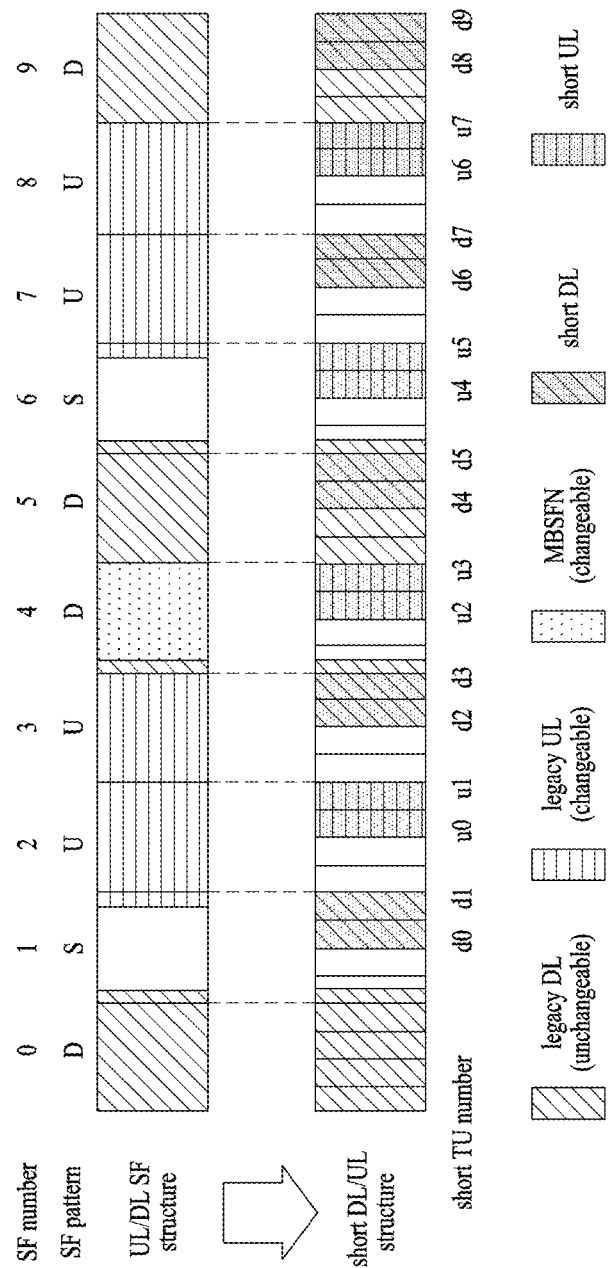
FIG. 13 illustrates a case that a method of configuring a short DL/UL is applied to a TDD system.

FIG. 13 illustrates a short UL/DL configuration according to an embodiment of the present invention. FIG. 13 illustrates a case that a method of configuring a short DL/UL is applied to a TDD system having an SF configuration based on UL-DL configuration #1. In the figure, it is assumed that four short TU intervals (e.g., 0.25 ms) are equal to one SF interval, and the short TI is 1 ms (or one SF or four short TU intervals). As shown in the figure, Method 3-based short DL configuration method may be applied to the S of SF #1, and Method 1-based short DL configuration method may be applied to the U of SF #3. Method 2-based short UL may be applied to the D of SF #4, and a Method 4-based short UL configuration method may be applied to the S of SF #6. The figure represents a case where all of Methods 1 to 4 are combined. However, this is simply an example, and Methods 1 to 4 may be used independently or in any combination. In the figure, {d0, u0, d2, u2, d4, u4, d6, u6, d8} on short TU numbers may be considered as corresponding to short DL/UL set at short TI intervals, and {d1, u1, d3, u3, d5, u5, d7, u7, d9} may be considered as another corresponding short DL/UL set at short TI intervals. In the figure, "changeable/unchangeable" indicates whether short UL configuration is possible.

The short DL/UL of the present invention may be configured over the entire system bandwidth (BW) or only in a specific frequency (e.g., RB) region smaller than the system BW.

Figure 14:
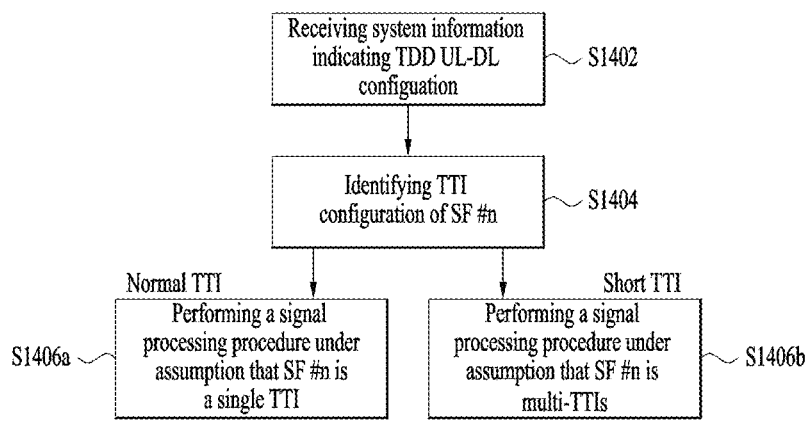
FIG. 14 illustrates a signal processing procedure according to an example of the present invention.

FIG. 14 illustrates a signal processing procedure according to an example of the present invention.

Referring to FIG. 14, the UE may receive system information indicating a TDD UL-DL configuration (S1402). The TDD UL-DL configuration represents an SF configuration of a radio frame (see Table 1). When a plurality of cells is merged for a UE based on carrier aggregation (CA), a TDD UL-DL configuration may be indicated for each cell. Then, the UE may check the TTI configuration of SF #n (S1404). The TTI configuration of SF #n may be a normal TTI or a short TTI. The normal TTI is a TTI of a legacy system (e.g., LTE/LTE-A) and has a length of one SF interval (i.e., 1 ms). On the other hand, the short TTI may be set to be shorter than the TTI of the legacy system (e.g., LTE/LTE-A). For example, the TU may be set to three OFDMA/SC-FDMA symbols or one slot interval (i.e., 0.5 ms). If the TTI configuration of SF #n is the normal TTI, the UE may perform the signal processing procedure on the assumption that SF #n is composed of one TTI (S1406a). In this case, transmission/reception of DL/UL data may be performed on an SF-by-SF basis. On the other hand, if the TTI configuration of SF #n is the short TTI, the UE may perform the signal processing procedure on the assumption that SF #n is composed of multiple TTIs (S1406b). Here, the signal processing procedure includes signal processing for transmitting and receiving signals through various physical channels of FIG. 1. For example, the signal processing procedure includes (i) a signal processing process for receiving a DL grant and receiving corresponding DL data, (ii) a signal processing process for receiving DL data and transmitting a corresponding HARQ-ACK, and (iii) a signal processing process for receiving a UL grant/PHICH and transmitting corresponding UL data. Here, transmission/reception of DL/UL data may be performed in units shorter than the SF. Configuring and signaling a short TTI in SF #n may conform to Methods 1 to 4. For example, the short TTI configuration in SF #n may be established as shown in FIG. 13.

(5) Scheme of Controlling Inter-Cell Interference Due to Short DL/UL Configuration When a short DL/UL is configured in a UL/DL SF configured in the conventional TDD system, it may be preferable to consider the influence of interference from an adjacent cell or on an adjacent cell. For example, if presence/absence of a short DL/UL configuration and related information are not exchanged/shared among adjacent cells, or a short DL/UL configuration pattern for each SF is not tightly shared in real time, significant performance degradation may be caused to the entire system due to interference between the short DL/UL (without a short DL/UL configured) and the normal UL/DL.

To address this issue, information such as whether the short DL/UL is configured and (candidate) SFs configurable with a short DL/UL (and/or a (candidate) frequency (e.g., RB) region configurable with short DL/UL) may be exchanged through signaling. In addition, an independent UL PC (Power Control) process separate from the normal UL SF may be performed for all short ULs or a specific short UL (e.g., a short UL configured in a DL (or S) SF), and the timing advance (TA) may also be independently set/controlled only for the corresponding short UL. In detail, open-loop PC parameters (e.g., PO_PUSCH, alpha, PO_PUCCH-related parameters) applied to PUSCH and PUCCH transmission in a short UL may be independently set (apart from the normal UL SF). In addition, the TPC command may be accumulated independently for the short UL (separately from the normal UL SF). Alternatively, the UL PC process (e.g., setting of open loop PC parameters, application of the TPC command, etc.) may be performed in common for the short UL and the normal UL SF, but a specific power offset may be added/applied to the UL transmit power in the short UL.

An independent UL PC process separate from the other UL SFs (not including the short DL) may be performed for a specific UL (or S) SF (which may include, for example, a short DL). In addition, independent open-loop PC parameter setting and TPC command accumulation operations may be performed for UL transmission in the specific UL (or S) SF (separately from the other normal UL SFs). Further, the UL PC process may be performed in common for all UL SFs, and a specific power offset may be added/applied to the UL transmit power in the specific UL (or S) SF.

The proposed method of the present invention is not limited to the TDD system. Even when the short UL is configured/set in any DL SF and/or the short DL is configured/set in any UL SF, the proposed may be may be modified and used. For example, using the proposed method in the FDD system environment, a short UL may be configured/set in a specific DL SF on the DL carrier and/or a short DL may be configured/set in a specific UL SF on the UL carrier.

Figure 15:
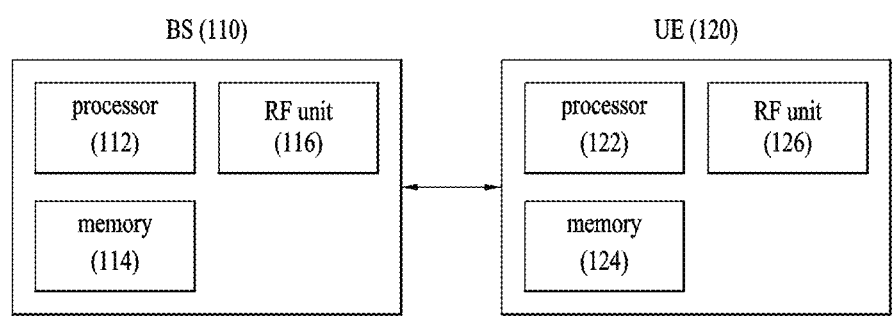
FIG. 15 illustrates a base station (BS) and a user equipment (UE) applicable to an embodiment of the present invention.

FIG. 15 illustrates a BS, a relay and a UE applicable to the present invention.

Referring to FIG. 15, a wireless communication system includes a BS 110 and a UE 120. When the wireless communication system includes a relay, the BS or UE can be replaced by the relay.

The BS includes a processor 112, a memory 114, an RF unit 116. The processor 112 may be configured to implement the procedures and/or methods proposed by the present invention. The memory 114 is connected to the processor 112 and stores information related to operations of the processor 112. The RF unit 116 is connected to the processor 112, transmits and/or receives an RF signal. The UE 120 includes a processor 122, a memory 124, and an RF unit 126. The processor 112 may be configured to implement the procedures and/or methods proposed by the present invention. The memory 124 is connected to the processor 122 and stores information related to operations of the processor 122. The RF unit 126 is connected to the processor 122, transmits and/or receives an RF signal.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present invention or included as a new claim by a subsequent amendment after the application is filed.

In the embodiments of the present invention, a description is made centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc. The term 'UE' may be replaced with the term 'Mobile Station (MS)', 'Mobile Subscriber Station (MSS)', 'mobile terminal', etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

The present invention is applicable to a UE, BS or other devices of a wireless mobile communication system. Specifically, the present invention is applicable to a method for transmitting uplink control information and an apparatus for the same.

What is claimed is:

1. A method for a device to perform a transmission in a wireless communication system, the method comprising:
   transmitting a plurality of transmit power control (TPC) commands; and.
   receiving a physical uplink shared channel (PUSCH) having transmit power determined using one of the plurality of TPC commands, based on a corresponding PUSCH type,
   wherein each one of the plurality of TPC commands is related with a respective one of PUSCH types, and the PUSCH types are related with PUSCH time lengths, and
   wherein the PUSCH time lengths include a time length shorter than a single subframe.

2. The method of claim 1, wherein the PUSCH types include a first PUSCH type with a length of 1 MS and a second PUSCH type with a length of 0.5 ms or less.

3. The method of claim 2, wherein the first PUSCH type includes 14 symbols, and the second PUSCH type includes 7 or less symbols.

4. The method of claim 1, wherein the plurality of TPC commands is related with power control for a same time duration.

5. The method of claim 2, wherein PUSCHs of the first PUSCH type and the second PUSCH type are allocated in a same time duration.

6. A device usable in a wireless communication system, the device comprising:
   a transceiver; and
   a processor connected to the transceiver,
   wherein the processor is configured to:
   transmit a plurality of transmit power control (TPC) commands; and
   receive a physical uplink shared channel (PUSCH) having transmit power determined using one of the plurality of TPC commands, based on a corresponding PUSCH type,
   wherein each one of the plurality of TPC commands is related with a respective one of PUSCH types, and the PUSCH types are related with PUSCH time lengths, and
   wherein the PUSCH time lengths include a time length shorter than a single subframe.

7. The device of claim 6, wherein the PUSCH types include a first PUSCH type with a length of 1 ms and a second PUSCH type with a length of 0.5 ms or less.

8. The device of claim 7, wherein the first PUSCH type includes 4 symbols, and the second PUSCH type includes 7 or less symbols.

9. The device of claim 6, wherein the plurality of TPC commands is related with power control for a same time duration.

10. The device of claim 7, wherein PUSCHs of the first PUSCH type and the second PUSCH type are allocated in a same time duration.

* * * * *